United States Patent [19]

Hosomi et al.

[11] Patent Number: 5,726,219
[45] Date of Patent: Mar. 10, 1998

[54] RESIN COMPOSITION AND PRINTED CIRCUIT BOARD USING THE SAME

[75] Inventors: Takeshi Hosomi; Hiroshi Hayai; Takayuki Baba, all of Fujieda, Japan

[73] Assignee: Sumitomo Bakelite Company Limited, Tokyo, Japan

[21] Appl. No.: 811,175

[22] Filed: Mar. 4, 1997

[30] Foreign Application Priority Data

Dec. 26, 1996 [JP] Japan .................. 8-347160

[51] Int. Cl.$^6$ .......................... C08F 2/46; C08F 283/00
[52] U.S. Cl. .................. 522/92; 522/100; 522/101; 522/103; 525/507; 525/529; 525/530; 525/531; 525/532; 525/922
[58] Field of Search .................. 522/92, 100, 101, 522/103; 525/507, 529, 530, 531, 532, 922

[56] References Cited

U.S. PATENT DOCUMENTS 5,098,766  3/1992  Gelorme et al. .......... 428/138
5,484,823  1/1996  Noguchi et al. .......... 522/92

FOREIGN PATENT DOCUMENTS 5287040  11/1993  Japan .
07-49464  5/1995  Japan .

*Primary Examiner*—Randy Gulakowski
*Attorney, Agent, or Firm*—Browdy and Neimark

[57] ABSTRACT

The present invention provides a rein composition comprising the following components (a), (b), (c), (d) and (e) as essential components; and an excellent multilayer printed circuit board obtained by using the resin composition:

(a) a polyfunctional epoxy resin having an epoxy equivalent of 120–500, (b) a modified phenol novolac obtained by reacting 20–60 mole % of the phenolic hydroxyl groups of a phenol novolac obtained by condensing a phenol compound with formaldehyde in the presence of an acidic catalyst, with a glycidyl group-containing acrylate or methacrylate, (c) an epoxy acrylate or epoxy methacrylate compound, (d) a diluent consisting of a polyfunctional monomer having a plurality of photosensitive functional groups or a polyfunctional monomer having a photosensitive functional group and a heat-sensitive functional group, or a diluent consisting of a combination of the two monomers, and (e) a photopolymerization initiator.

17 Claims, No Drawings

RESIN COMPOSITION AND PRINTED CIRCUIT BOARD USING THE SAME

BACKGROUND OF THE INVENTION

1. Field of the Invention

The present invention relates to a resin composition useful particularly for a permanent resist in a printed circuit board, as well as to a printed circuit board obtained by using the resin composition.

2. Related Art Statement

Printed circuit boards have been produced by a subtractive process using a copper-clad laminate, wherein the portion of copper foil unnecessary for circuit is removed by etching. This subtractive process, however, have drawbacks, for example, in that formation of a circuit board of fine pattern and high density is difficult and uniform electroplating of small-diameter throughholes and via holes is impossible; therefore, the process is unable to produce an electronic apparatus of high density.

Recently, attention has been paid to a full additive process which comprises forming an adhesive layer on a laminate made of an insulating material and then forming a circuit and throughholes therein by electroless plating. In this process, since the accuracy of conductor pattern is determined solely by the accuracy of plating resist resolution and the conductor portion is formed solely by electroless plating, uniform and high-throwing power plating of throughholes is possible even in a substrate having throughholes of high aspect ratio. This process has been considered to be suitable for production of a substrate for home use or personal use, but is coming to be used for production of a high density, highly multilayered substrate for industrial use.

In the additive process generally used for production of a substrate for home use or personal use, a plating resist is coated by screen printing. In producing a printed circuit board of high-density wiring, however, a plating resist pattern must be formed by a photoengraving process, i.e. a photoadditive process using a photoresist. The photoresist suitably used in the photoadditive process is required to have, for example, the following properties, in addition to the basic properties (e.g. photosensitivity, resolution and developability) needed for any photoresist.

(1) Since only a 1,1,1-trichloroethane type organic solvent or an aqueous alkali solution is used for development, the photoresist must be able to be developed with either of the above developers.

(2) The photoresist must be able to withstand electroless plating which is conducted under high-temperature and highly alkaline conditions for a long time.

(3) The photoresist after plating must have excellent soldering resistance as a permanent resist.

(4) The photoresist must have sufficient heat resistance even at about 260° C. employed in soldering.

(5) When the photoresist is coated, the resulting substrate must have sufficient thermal reliability.

Some photoresists usable in the above photoadditive process are commercially available, but none of them is sufficient.

To satisfy the above property requirements for photoresist, there are reported, in, for example, JP-B-7-49464, curable compositions each comprising a compound having, in the molecule, a phenolic hydroxyl group and a (meth)acryloyl group, an epoxy compound and a photopolymerization initiator and capable of giving rise to a photoreaction and a thermal reaction. In these curable compositions, however, since the compound having, in the molecule, a phenolic hydroxyl group and a (meth)acryloyl group has a small molecular weight and since the contrast, which is decided with a balance between dissolution rate and photosensitivity, is small when alkali development with an aqueous sodium hydroxide solution is employed, there takes place overexposure caused by halation or surface deterioration caused by developer, in development of high resolution although there is no such problem in development of low resolution.

OBJECT OF THE INVENTION

The objects of the present invention are to provide a resin composition useful for a permanent resist, which can form, by photography, a high-resolution resist pattern by using an aqueous alkali solution as a developer, which can well withstand an electroless copper plating solution used in full additive process, which is heat-resistant even at a temperature of about 260° C. employed in soldering, and which can be used without being removed until a final product is obtained; and to provide a printed circuit board obtained by using the resin composition.

SUMMARY OF THE INVENTION

The resin composition of the present invention satisfying the above objects are characterized by having the undermentioned composition, showing excellent properties as a permanent resist, and being usable for production of an excellent printed circuit board.

According to the present invention, there are provided a rein composition comprising the following components (a), (b), (c), (d) and (e) as essential components; and a printed circuit board obtained by using the resin composition:

(a) a polyfunctional epoxy resin having an epoxy equivalent of 120–500, (b) a modified phenol novolac obtained by reacting 20–60 mole % of the phenolic hydroxyl groups of a phenol novolac obtained by condensing a phenol compound with formaldehyde in the presence of an acidic catalyst, with a glycidyl group-containing acrylate or methacrylate, (c) an epoxy acrylate or epoxy methacrylate compound, (d) a diluent consisting of a polyfunctional monomer having a plurality of photosensitive functional groups or a polyfunctional monomer having a photosensitive functional group and a heat-sensitive functional group, or a diluent consisting of a combination of the two monomers, and (e) a photopolymerization initiator.

DETAILED DESCRIPTION OF THE INVENTION

The epoxy resin as the component (a) used in the present invention is preferably a bisphenol A or F type epoxy resin. Its number-average molecular weight is preferably 1,000 or smaller, because when the number-average molecular weight is larger than 1,000, the resulting resin composition has inferior developability with an aqueous alkali solution.

The modified phenol novolac as the component (b) can be obtained by reacting a phenol novolac (obtained by condensing a phenol compound having one or more phenolic hydroxyl groups in the molecule, with formaldehyde in the presence of an acidic catalyst) with a glycidyl group-containing acrylate or methacrylate. In order to obtain a permanent resist having excellent alkali developability after photopolymerization and excellent pattern accuracy, it is appropriate to use the glycidyl group-containing acrylate or methacrylate in an amount of 0.2–0.6 epoxy group equivalent per equivalent of the hydroxyl group of the phenol novolac. When the epoxy group equivalent is less than 0.2, the resulting resin composition has low photopolymerizability and the composition after photopolymerization with an ultraviolet light dissolves in a developer, making it impossible to obtain the intended resolution. When the epoxy group equivalent is more than 0.6, the resulting resin composition has low alkali solubility and is insoluble in developer even before photopolymerization, making it impossible to obtain the intended resolution as well. In order to increase the contrast of solubility in aqueous alkali solution as a result of photopolymerization and achieve high resolution, it is necessary to react 20–60 mole %, preferably 40–50 mole % of the phenolic hydroxyl groups of the phenol novolac with a glycidyl group-containing acrylate or methacrylate.

In order to increase the contrast of development, it is preferable to use a modified bisphenol novolac obtained by reacting 20–60 mole % of the phenolic hydroxyl groups of a bisphenol novolac (obtained by condensing bisphenol A or F having two phenolic hydroxyl groups in the molecule, with formaldehyde in the presence of an acidic catalyst), with a glycidyl group-containing acrylate or methacrylate. Such a modified bisphenol novolac is preferred because the novolac, although it has a higher molecular weight, gives small change in dissolution rate and can have high sensitivity in development. The reason is not made clear but is presumed to be that the intramolecular movement of the bisphenol novolac is restrained and it reduces the cohesion of hydrophilic groups or hydrophobic groups due to the higher molecular weight. The bisphenol compound having two phenolic hydroxyl groups in the molecule includes bisphenol S, etc., besides bisphenol A or F. The glycidyl group-containing acrylate or methacrylate is preferably glycidyl acrylate or glycidyl methacrylate in view of the reactivity, availability, etc.

An alkyl- or alkenylphenol novolac is also usable as the starting material for the component (b). In this case, the alkyl or alkenyl group preferably has about 1–4 carbon atoms, and examples thereof are methyl group, ethyl group, n-propyl group, isopropyl group, n-butyl group, sec-butyl group, tert-butyl group and allyl group. An alkyl or alkenyl group having 5 or more carbon atoms is not preferred because of higher hydrophobicity and lower alkali developability.

Component (b) is used preferably in an amount of 0.9–1.1 equivalents of phenolic hydroxyl group of component (b) per equivalent of glycidyl group of component (a). Use outside the range reduces heat resistance after moistened and chemical resistance of the resulting final product.

The epoxy acrylate or epoxy methacrylate compound as the component (c) has no particular restriction as to the type. It can be obtained by reacting an epoxy compound (e.g. bisphenol A type epoxy compound, bisphenol F type epoxy compound, bisphenol S type epoxy compound, phenol novolac type epoxy compound, cresol novolac type epoxy compound or aliphatic epoxy compound) with acrylic acid or methacrylic acid. When higher solubility in aqueous alkali solution or higher adhesion to insulating substrate or metal is desired, the component (c) may be obtained by one of the following processes.

(1) The above reaction product between an epoxy compound and acrylic acid or methacrylic acid is reacted with a dicarboxylic acid compound having an acid value of 5–100, such as oxalic acid, malonic acid, succinic acid, glutamic acid, adipic acid, maleic acid, fumaric acid, phthalic acid, terephthalic acid or the like, or with an anhydride thereof.

(2) In the above reaction between an epoxy compound and acrylic acid or methacrylic acid, the epoxy group of the epoxy compound is allowed to remain unreacted in an amount necessary for later modification with dicarboxylic acid, and the resulting reaction product is reacted with a dicarboxylic acid compound having an acid value of 5–100, such as oxalic acid, malonic acid, succinic acid, glutamic acid, adipic acid, maleic acid, fumaric acid, phthalic acid, terephthalic acid or the like, or with an anhydride thereof.

In the above processes, use of a dicarboxylic acid compound having an acid value lower than 5 gives a resin composition of low solubility in aqueous alkali solution; use of a dicarboxylic acid compound having an acid value higher than 100 gives a resin composition having inferior resist properties in chemical resistance, electrical property, etc. when cured.

Component (c) is used preferably in an amount of 5–20 weight % based on the total weight of components (a) to (d) in view of developability.

The diluent consisting of a polyfunctional monomer having a plurality of photosensitive functional groups, as the component (d) includes compounds having at least two acryloyl or methacryloyl groups in the molecule, for example, ethylene glycol diacrylate, ethylene glycol dimethacrylate, diethylene glycol diacrylate, diethylene glycol dimethacrylate, 1,4-butanediol diacrylate, 1,4-butanediol dimethacrylate, 1,3-butanediol diacrylate, 1,3-butanediol dimethacrylate, 1,6-hexanediol diacrylate, 1,6-hexanediol dimethacrylate, glycerol diacrylate, neopentyl glycol diacrylate, bisphenol A diacrylate, trimethylolpropane triacrylate, pentaerythritol triacrylate and pentaerythritol tetraacrylate. Of these, preferred are trimethylolpropane triacrylate, pentaerythritol triacrylate and pentaerythritol tetraacrylate, all of which are tri- or tetrafunctional and have excellent resistance to developer after photopolymerization.

The diluent consisting of a polyfunctional monomer having a photosensitive functional group and a heat-sensitive functional group, also as the component (d) includes acrylate or methacrylate compounds having at least one hydroxyl group in the molecule, for example, hydroxyethyl acrylate, hydroxyethyl methacrylate, hydroxypropyl acrylate, hydroxypropyl methacrylate, hydroxybutyl acrylate, hydroxybutyl methacrylate, butanediol monoacrylate, glycerol methacrylate, phenoxyhydroxypropyl acrylate, polyethylene glycol acrylate, polyethylene glycol methacrylate and glycerol dimethacrylate. There can also be used glycidyl acrylate and glycidyl methacrylate both having a glycidyl group.

These polyfunctional monomers having a plurality of photosensitive groups are high in velocity of photoreaction and allow photopolymerization even to the deep place at a low energy irradiation; therefore, high resolution is possible, there is no deterioration by developer at the photopolymerized portions, and even in the photo via holes of high aspect ratio, the sides after development are linear and undercut, etc. can be prevented.

The acrylate or methacrylate compound having at least one hydroxyl group in the molecule is water-soluble owing to its hydroxyl group and can give a higher contrast in the development with aqueous alkali solution.

When there is required higher chemical resistance after heat-curing, there can be used glycidyl acrylate or glycidyl methacrylate both capable of reacting with a carboxyl group or phenolic hydroxyl group.

These polyfunctional monomers can be used singly or in combination, and the amounts used can be determined from the balance of developability and properties after curing.

Component (d) is used preferably in an amount of 1–15 weight % based on the total weight of components (a) to (d).

The photopolymerization initiator as the component (e) includes, for example, benzophenones such as benzophenone, benzoylbenzoic acid, 4-phenylbenzophenone, hydroxybenzophenone and the like; benzoin; benzoin alkyl ethers such as benzoin ethyl ether, benzoin isopropyl ether, benzoin butyl ether, benzoin isobutyl ether, benzyl dimethyl ketal and the like; acetophenones such as 4-phenoxy-dichloroacetophenone, 4-t-butyl-dichloroacetophenone, 4-t-butyl-trichloroacetophenone, diethoxyacetophenone and the like; thioxanthones such as thioxanthone, 2-chlorothioxanthone, 2-methylthioxanthone, 2,4-dimethylthioxanthone and the like; and alkylanthraquinones such as ethylanthraquinone, butylanthraquinone and the like. These compounds can be used singly or in admixture of two or more compounds. The amount of the photopolymerization initiator used is generally 0.1–10% by weight based on the composition.

When the resin composition of the present invention is irradiated with an ultraviolet light, the photopolymerization initiator (e) generates a radical; the radical reacts with the acryloyl and/or methacryloyl groups possessed by the components (b), (c) and (d); and polymerization takes place between the resulting groups. In subsequent heating of the composition, the glycidyl group of the component (a) and the phenolic hydroxyl group of the component (b) are polymerized to give rise to curing. At this time, when the component (d) has a hydroxyl group or the component (c) has a carboxyl group, the hydroxyl group or the carboxyl group reacts with the glycidyl group of the component (a). When the component (d) has a glycidyl group, the glycidyl group reacts with the phenolic hydroxyl group of the component (b).

The resin composition of the present invention can further comprise, if necessary, an ultraviolet absorber and a thermal polymerization inhibitor both for storage stability, a plasticizer, etc.

The present resin composition comprising the above-mentioned components has high resolution and is superior in developability with aqueous alkali solution. The solubility of the resin composition in aqueous alkali solution is given mainly by the remaining phenolic hydroxyl group of the modified phenol novolac (b) and is higher when the epoxy acrylate or methacrylate compound (c) has a carboxyl group. As mentioned previously, the photopolymerization products wherein these functional groups remain, are insufficient in alkali resistance, chemical resistance, electrical properties, etc. However, the present resin composition is photopolymerized and, after development, is heat-cured; in this heat-curing, the epoxy resin (a) causes a heat-curing reaction with the phenolic hydroxyl group of the component (b) and the carboxyl group of the component (c) or the hydroxyl group of the component (d), and in some cases the glycidyl group of the component (d) reacts with the phenolic hydroxyl group of the component (b), to form a main skeleton having excellent properties. Therefore, the present resin composition can become a cured permanent resist capable of withstanding electroless plating conducted for a long time under high-temperature and highly alkaline conditions.

The resin composition according to the present invention is coated on an adhesive for additive plating in a film thickness of 20–60 µm and is made tack-free or converted into a prepolymer by a heat treatment of 60°–100° C. for about 5–30 minutes, whereby a resist layer is formed. Alternatively, the present resin composition may be coated on a carrier film and then made tack-free or converted into a prepolymer by the same heat treatment, and the tack-free or prepolymer film obtained may be laminated on an adhesive for additive plating.

DESCRIPTION OF PREFERRED EMBODIMENTS

The present invention is hereinafter described in detail with reference to Examples.

Synthesis Example 1

Synthesis of methacryloyl group-containing phenol novolac

In a 2-liter flask was placed, as a phenol novolac, 700 g (OH: about 4 equivalents) of Phenolite TD-2090-60M (a methyl ethyl ketone solution having a non-volatile content of 60%, manufactured by Dainippon Ink and Chemicals, Incorporated). Thereto were added 0.2 g of hydroquinone and 284 g (2 moles) of glycidyl methacrylate. The flask contents were heated to 110° C. Thereto was added 1 g of tributylamine. The resulting mixture was stirred at 110° C. for 5 hours to give rise to a reaction.

Synthesis Example 2

Synthesis of methacryloyl group-containing phenol novolac

In a 2-liter flask was placed, as a phenol novolac, 700 g (OH: about 4 equivalents) of Phenolite TD-2090-60M. Thereto were added 0.2 g of hydroquinone and 398 g (2.8 moles) of glycidyl methacrylate. The flask contents were heated to 110° C. Thereto was added 1 g of tributylamine. The resulting mixture was stirred at 110° C. for 5 hours to give rise to a reaction.

Synthesis Example 3

Synthesis of methacryloyl group-containing bisphenol A novolac

In a 2-liter flask was placed, as a bisphenol A novolac, 800 g (OH: about 4 equivalents) of Phenolite LF-4871 (a methyl ethyl ketone solution having a non-volatile content of 60%, manufactured by Dainippon Ink and Chemicals, Incorporated). Thereto were added 0.2 of hydroquinone and 284 g (2 moles) of glycidyl methacrylate. The flask contents were heated to 110° C. Thereto was added 1 g of tributylamine. The resulting mixture was stirred at 110° C. for 5 hours to give rise to a reaction.

Synthesis Example 4

Synthesis of methacryloyl group-containing bisphenol A novolac

In a 2-liter flask was placed, as a bisphenol A novolac, 800 g (OH: about 4 equivalents) of Phenolite LF-4871. Thereto were added 0.2 g of hydroquinone and 398 g (2.8 moles) of glycidyl methacrylate. The flask contents were heated to 110° C. Thereto was added 1 g of tributylamine. The resulting mixture was stirred at 110° C. for 5 hours to give rise to a reaction.

Synthesis Example 5

Synthesis of carboxyl group-containing epoxy acrylate

In a 2-liter flask were placed 760 g (4 equivalents) of Epikote 828 (a bisphenol A type epoxy resin having an epoxy equivalent of 190, manufactured by Yuka Shell Epoxy K.K.) and 1 g of methoxyphenol as a polymerization inhibitor. Thereto were added 288 g (4 moles) of acrylic acid and 1 g of benzyldimethylamine. The resulting mixture was stirred at 100° C. for 6 hours to give rise to a reaction. Thereto was added 160 g (1.6 moles) of succinic anhydride, followed by stirring at 80° C. for 3 hours to give rise to a reaction.

Example 1

There were mixed 100 parts by weight of the methacryloyl group-containing phenol novolac of Synthesis Example 1, 15 parts by weight of the carboxyl group-containing epoxy acrylate of Synthesis Example 5, 10 parts by weight of pentaerythritol triacrylate and 25 parts by weight of Epikote 828. Thereto were added 5 parts by weight of Irgacure 651 (manufactured by Ciba Geigy Co.) as a photopolymerization initiator and 0.2 part by weight of triphenylphosphine as a heat-curing accelerator. The resulting mixture was thoroughly stirred to obtain a resin composition.

Example 2

There were mixed 100 parts by weight of the methacryloyl group-containing phenol novolac of Synthesis Example 1, 15 parts by weight of Epoxy Acrylate SP-4010 (a reaction product between phenol novolac type epoxy compound and acrylic acid, manufactured by Showa Highpolymer Co., Ltd.), 10 parts by weight of pentaerythritol triacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 3

There were mixed 100 parts by weight of the methacryloyl group-containing bisphenol A novolac of Synthesis Example 3, 15 parts by weight of the carboxyl group-containing epoxy acrylate of Synthesis Example 5, 10 parts by weight of pentaerythritol triacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 4

There were mixed 100 parts by weight of the methacryloyl group-containing bisphenol A novolac of Synthesis Example 3, 15 parts by weight of Epoxy Acrylate SP-4010, 10 parts by weight of pentaerythritol triacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 5

There were mixed 100 parts by weight of the methacryloyl group-containing phenol novolac of Synthesis Example 1, 15 parts by weight of the carboxyl group-containing epoxy acrylate of Synthesis Example 5, 10 parts by weight of hydroxyethyl methacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 6

There were mixed 100 parts by weight of the methacryloyl group-containing phenol novolac of Synthesis Example 1, 15 parts by weight of the carboxyl group-containing epoxy acrylate of Synthesis Example 5, 10 parts by weight of glycidyl methacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 7

There were mixed 100 parts by weight of the methacryloyl group-containing bisphenol A novolac of Synthesis Example 3, 15 parts by weight of the carboxyl group-containing epoxy acrylate of Synthesis Example 5, 10 parts by weight of hydroxyethyl methacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Example 8

There were mixed 100 parts by weight of the methacryloyl group-containing bisphenol A novolac of Synthesis Example 3, 15 parts by weight of the carboxyl group-containing epoxy acrylate of Synthesis Example 5, 10 parts by weight of glycidyl methacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Comparative Example 1

There were mixed 100 parts by weight of the carboxyl group-containing epoxy acrylate of Synthesis Example 5 and 20 parts by weight of pentaerythritol triacrylate. Thereto was added 5 parts by weight of Irgacure 651 as a photopolymerization initiator to obtain a resin composition.

Comparative Example 2

There were mixed 100 parts by weight of the methacryloyl group-containing phenol novolac of Synthesis Example 2, 15 parts by weight of the carboxyl group-containing epoxy acrylate of Synthesis Example 5, 10 parts by weight of pentaerythritol triacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Comparative Example 3

There were mixed 100 parts by weight of the methacryloyl group-containing bisphenol A novolac of Synthesis Example 4, 15 parts by weight of the carboxyl group-containing epoxy acrylate of Synthesis Example 5, 10 parts by weight of pentaerythritol triacrylate and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Comparative Example 4

There were mixed 100 parts by weight of the methacryloyl group-containing phenol novolac of Synthesis Example 1, 15 parts by weight of the carboxyl group-containing epoxy acrylate of Synthesis Example 5 and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Comparative Example 5

There were mixed 100 parts by weight of the methacryloyl group-containing bisphenol A novolac of Synthesis Example 3, 15 parts by weight of the carboxyl group-containing epoxy acrylate of Synthesis Example 5 and 25 parts by weight of Epikote 828. Thereto were added 5 parts by weight of Irgacure 651 as a photopolymerization initiator and 0.2 part by weight of triphenylphosphine as a heat-curing accelerator. The resulting mixture was thoroughly stirred to obtain a resin composition.

Production of multilayer printed circuit boards by additive plating process

Each of the resin compositions obtained in Examples 1-8 and Comparative Examples 1-5 was coated, in a film thickness of 40 μm, on a laminate board having thereon an adhesive (for additive plating) containing an activated catalyst. The coated laminate board was heat-treated at 80° C. for 20 minutes. Only in the case of the resin composition of Comparative Example 1, since the coated resin composition was tacky even after the heat-treatment, a cover film capable of transmitting an ultra-violet light was placed on the composition. On the coated laminate board after the heat-treatment was placed a pattern of 50 μm in line width and 50 μm in space between lines, and light exposure was conducted on the pattern at a dose of 200 mJ/cm² using a high-pressure mercury lamp aligner. Then, development was conducted with a 1.5% aqueous sodium hydroxide solution of 25° C. by spraying the solution at a pressure of 2 kg/m². After water-washing and drying, post-exposure was conducted on the whole surface of the resulting material at a dose of 1 J/cm². Thereafter, a heat-treatment was applied at 150° C. for 30 minutes. The resulting material was dipped in an electroless copper plating solution (KC-500 manufactured by Japan Energy Corporation) at 70° C. for 5 hours to form a copper film of about 25 μm in thickness, followed by drying at 150° C. for 1 hour to obtain a multilayer printed circuit board.

The resist properties shown during the above process for production of a multilayer printed circuit board were examined by the following test methods. The results are shown in Table 1.

Test methods

Dissolution time

There was measured a time up to when an unexposed resin composition was completely dissolved and removed.

Step No. according to Stouffer 21 step tablet test

A Stouffer 21-step tablet was placed on the laminate board coated with the resin composition, followed by light exposure. Then, development was conducted for a time length two times as long as the above dissolution time. A step number at which no surface deterioration was seen, was examined. (This test was not conducted in the case of no dissolution in developer.) A larger step number indicates better curability.

Line shape

The laminate board coated with the resin composition was exposed to light and then development was conducted for a time length two times as long as the above dissolution time, followed by post-exposure and heat-curing. Then, the sectional shape of line was examined. (This test was not conducted in the case of no dissolution in developer.)

Soldering heat resistance after moistened

A multilayer printed circuit board produced was moistened for 1 hour using a saturated pressure cooker at 121° C. and then dipped in solder of 260° C. for 20 seconds. Time lengths up to when five samples were destructed, were measured and an average thereof was calculated.

Resistance to plating solution

A multilayer printed circuit board produced by additive plating process was observed for appearance. The appearance was rated as o when there was seen no change in electroless plating, and as X when there was seen a change.

TABLE 1

| | Dissolution time (sec) | Step number | Line sectional shape | Soldering heat resistance after moistened (sec) | Resistance to plating solution |
|---|---|---|---|---|---|
| Ex. 1 | 25 | 4 | Straight | 20 | o |
| Ex. 2 | 35 | 5 | Straight | 20 | o |
| Ex. 3 | 30 | 5 | Straight | 20 | o |
| Ex. 4 | 40 | 6 | Straight | 20 | o |
| Ex. 5 | 20 | 4 | Straight | 20 | o |
| Ex. 6 | 30 | 5 | Straight | 20 | o |
| Ex. 7 | 25 | 4 | Straight | 20 | o |
| Ex. 8 | 35 | 5 | Straight | 20 | o |
| Comp. Ex. 1 | 20 | 3 | Straight | 20 | x |
| Comp. Ex. 2 | Not dissolved | — | — | 20 | o |
| Comp. Ex. 3 | Not dissolved | — | — | 20 | o |
| Comp. Ex. 4 | 30 | 2 | Undercut | 20 | o |
| Comp. Ex. 5 | 35 | 2 | Undercut | 20 | o |

As described above, the resin composition of the present invention gives a highly heat-resistant permanent resist by being photopolymerized and then heat-cured. The present resin composition has high resolution; can be easily developed with an aqueous alkali solution; nevertheless, has excellent resistance to plating solution, in electroless plating conducted for a long time under high-temperature and highly alkaline conditions. Moreover, the present resin composition can withstand a temperature of about 260° C. employed in soldering, and thus, has made it possible to produce a printed circuit board of excellent soldering heat resistance.

What is claimed is:

1. A resin composition comprising the following components (a), (b), (c), (d) and (e) as essential components:

(a) a polyfunctional epoxy resin having an epoxy equivalent of 120–500.

(b) a modified phenol novolac obtained by reacting 20–60 mole % of the phenolic hydroxyl groups of a phenol novolac obtained by condensing a phenol compound with formaldehyde in the presence of an acidic catalyst, with a glycidyl group-containing acrylate or methacrylate, (c) an epoxy acrylate or epoxy methacrylate compound, (d) a diluent consisting of a polyfunctional monomer having a plurality of photosensitive functional groups or a polyfunctional monomer having a photosensitive functional group and a heat-sensitive functional group, or a diluent consisting of a combination of the two monomers, and (e) a photopolymerization initiator.

2. A resin composition comprising the following components (a), (b), (c), (d) and (e) as essential components:

(a) a polyfunctional epoxy resin having an epoxy equivalent of 120–500, (b) a modified bisphenol novolac obtained by reacting 20–60 mole % of the phenolic hydroxyl groups of a bisphenol novolac obtained by condensing bisphenol A or F with formaldehyde in the presence of an acidic catalyst, with a glycidyl group-containing acrylate or methacrylate, (c) an epoxy acrylate or epoxy methacrylate compound, (d) a diluent consisting of a polyfunctional monomer having a plurality of photosensitive functional groups or a polyfunctional monomer having a photosensitive functional group and a heat-sensitive functional group, or a diluent consisting of a combination of the two monomers, and (e) a photopolymerization initiator.

3. A resin composition according to claim 1, wherein the polyfunctional epoxy resin (a) is a bisphenol A or F epoxy resin.

4. A resin composition according to claim 2, wherein the polyfunctional epoxy resin (a) is a bisphenol A or F epoxy resin.

5. A resin composition according to claim 1, wherein the modified phenol novolac (b) is obtained by reacting 40–50 mole % of the phenolic hydroxyl groups of a phenol novolac obtained by condensing a phenol compound with formaldehyde in the presence of an acidic catalyst, with glycidyl acrylate or glycidyl methacrylate.

6. A resin composition according to claim 1, wherein the epoxy acrylate or epoxy methacrylate compound (c) is obtained by reacting an epoxy compound selected from the group consisting of a bisphenol A epoxy compound, a bisphenol F epoxy compound, a bisphenol S epoxy compound, a phenol novolac epoxy compound, a cresol novolac epoxy compound and an aliphatic epoxy compound, with acrylic acid or methacrylic acid.

7. A resin composition according to claim 2, wherein the epoxy acrylate or epoxy methacrylate compound (c) is obtained by reacting an epoxy compound selected from the group consisting of a bisphenol A epoxy compound, a bisphenol F epoxy compound, a bisphenol S epoxy compound, a phenol novolac epoxy compound, a cresol novolac epoxy compound and an aliphatic epoxy compound, with acrylic acid or methacrylic acid.

8. A resin composition according to claim 1, wherein the epoxy acrylate or epoxy methacrylate compound (c) is obtained by reacting the epoxy group of an epoxy compound selected from the group consisting of a bisphenol A epoxy compound, a bisphenol F epoxy compound, a bisphenol S epoxy compound, a phenol novolac epoxy compound, a cresol novolac epoxy compound and an aliphatic epoxy compound, with acrylic acid or methacrylic acid completely or partially and then reacting the reaction product with a dicarboxylic acid compound having an acid value of 5–100 selected from the group consisting of oxalic acid, malonic acid, succinic acid, glutamic acid, adipic acid, maleic acid, fumaric acid, phthalic acid and terephthalic acid, or with an acid anhydride thereof.

9. A resin composition according to claim 2, wherein the epoxy acrylate or epoxy methacrylate compound (c) is obtained by reacting the epoxy group of an epoxy compound selected from the group consisting of a compound, a bisphenol epoxy compound, a phenol novolac epoxy compound, a cresol novolac epoxy compound and an aliphatic epoxy compound, with acrylic acid or methacrylic acid completely or partially and then reacting the reaction product with a dicarboxylic acid compound having an acid value of 5–100 selected from the group consisting of oxalic acid, malonic acid, succinic acid, glutamic acid, adipic acid, maleic acid, fumaric acid, phthalic acid and terephthalic acid, or with an acid anhydride thereof.

10. A resin composition according to claim 1, wherein the diluent (d) consisting of a polyfunctional monomer having a plurality of photosensitive functional groups is a compound having, in the molecule, at least two acryloyl or methacryloyl groups.

11. A resin composition according to claim 10, wherein the compound having, in the molecule, at least two acryloyl or methacryloyl groups is selected from the group consisting of trimethylolpropane triacrylate, pentaerythritol triacrylate and pentaerythritol tetraacrylate.

12. A resin composition according to claim 2, wherein the diluent (d) consisting of a polyfunctional monomer having a plurality of photosensitive functional groups is a compound having, in the molecule, at least two acryloyl or methacryloyl groups.

13. A resin composition according to claim 12, wherein the compound having, in the molecule, at least two acryloyl or methacryloyl groups is selected from the group consisting of trimethylolpropane triacrylate, pentaerythritol triacrylate and pentaerythritol tetraacrylate.

14. A resin composition according to claim 1, wherein the diluent (d) consisting of a polyfunctional monomer having a photosensitive functional group and a heat-sensitive functional group is an acrylate or methacrylate compound having at least one hydroxyl group in the molecule, or glycidyl acrylate or glycidyl methacrylate.

15. A resin composition according to claim 2, wherein the diluent (d) consisting of a polyfunctional monomer having a photosensitive functional group and a heat-sensitive functional group is an acrylate or methacrylate compound having at least one hydroxyl group in the molecule, or glycidyl acrylate or glycidyl methacrylate.

16. A resin composition according to claim 1, further comprising a heat-curing accelerator.

17. A resin composition according to claim 2, further comprising a heat-curing accelerator.

* * * * *